United States Patent [19]

Kaneko et al.

[11] Patent Number: 4,756,585
[45] Date of Patent: Jul. 12, 1988

[54] OPTICAL BEAM SCANNING SYSTEM

[75] Inventors: Yutaka Kaneko, Kanagawa; Nobuo Sakuma, Tokyo, both of Japan

[73] Assignee: Ricoh Company, Ltd., Tokyo, Japan

[21] Appl. No.: 888,466

[22] Filed: Jul. 21, 1986

[30] Foreign Application Priority Data

Jul. 31, 1985 [JP] Japan .................. 60-169338

[51] Int. Cl.⁴ .................. G02B 26/10; G02B 3/02
[52] U.S. Cl. ..................... 350/6.8; 350/433; 350/434; 350/571
[58] Field of Search ................ 350/6.7, 6.8, 432, 433, 350/434, 571

[56] References Cited

U.S. PATENT DOCUMENTS

| | | | |
|---|---|---|---|
| 4,203,652 | 5/1980 | Hanada | 350/434 |
| 4,447,112 | 5/1984 | Matsuok et al. | 350/434 |
| 4,512,625 | 4/1985 | Brueggemann | 350/6.8 |
| 4,571,035 | 2/1986 | Sakuma | 350/6.8 |
| 4,630,130 | 12/1986 | Parisi | 350/6.8 |

Primary Examiner—John K. Corbin
Assistant Examiner—Ronald M. Kachmarik
Attorney, Agent, or Firm—Cooper & Dunham

[57] ABSTRACT

An optical beam scanning system which is employed as an optical scanning means for writing or reading information with a laser beam includes a lens disposed in front of a light deflector with respect to the path of travel of the laser beam. The lens has an optical axis normal to the axis of rotation or angular movement of the light deflector. The lens is arranged such that the laser beam will be applied thereto parallel to the optial axis thereof and at a suitable lens height thereon. The laser beam that has reached the light deflector through the lens is reflected as a scanning light beam as the light deflector rotates or is angularly moved.

52 Claims, 7 Drawing Sheets

F I G. 12
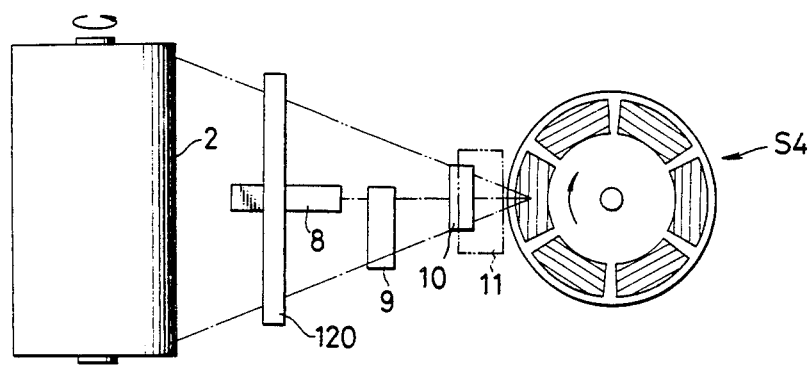
F I G. 13
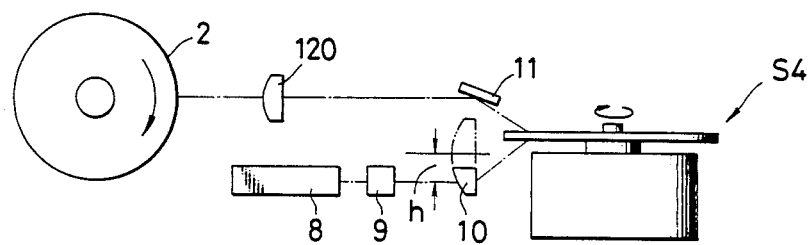
F I G. 14
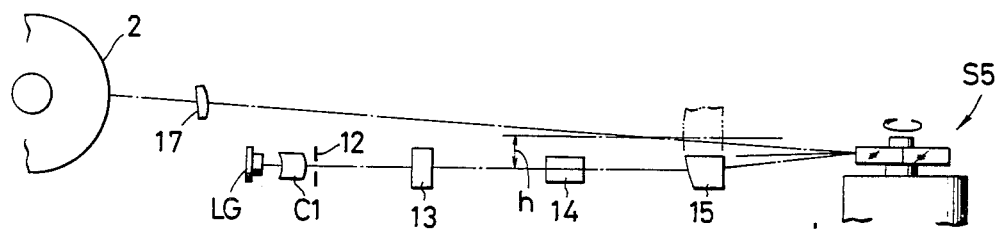

F I G. 15
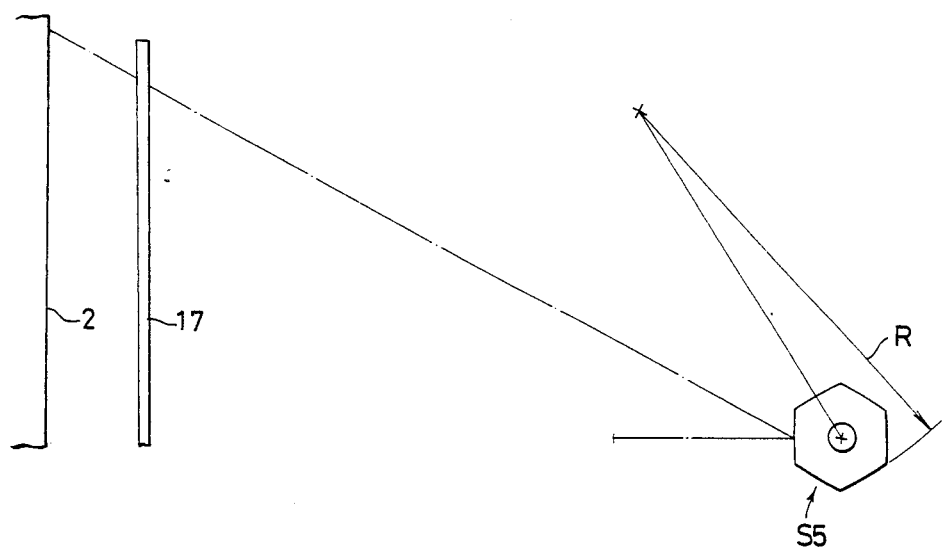
F I G. 17
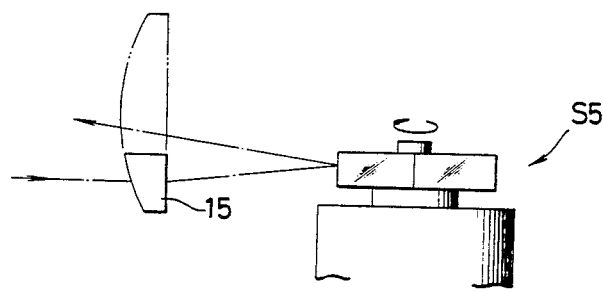
F I G. 18
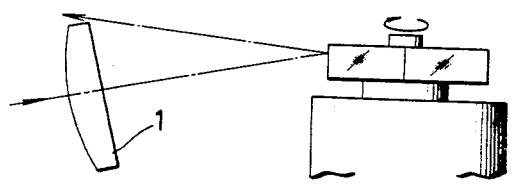

F I G. 16
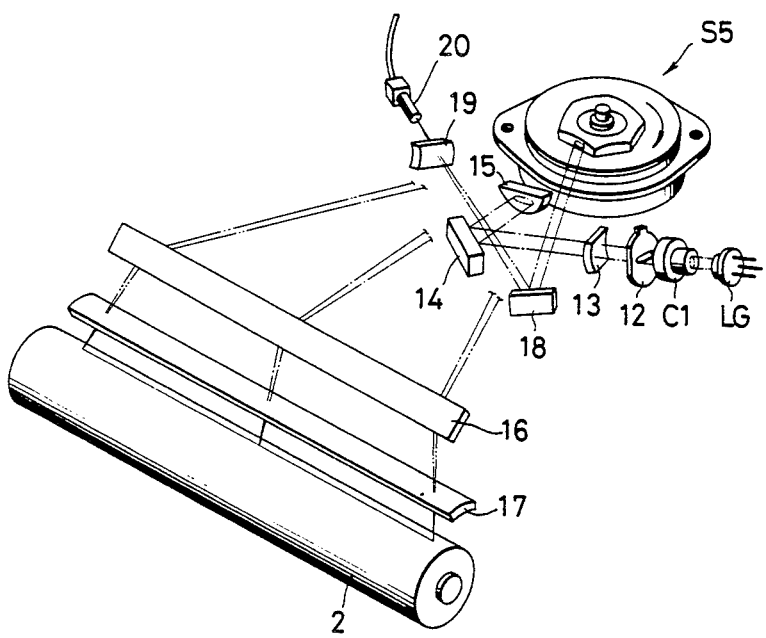

4,756,585

OPTICAL BEAM SCANNING SYSTEM

BACKGROUND OF THE INVENTION

The present invention relates to an optical beam scanning system.

There are known optical systems employing a light deflector for scanning a light beam. For utilization of a scanned light beam in a greater range without physical interference with a light beam applied to the light deflector, it has been the general practice to apply the light beam to the light deflector in a direction toward the axis of rotation of the light deflector and at a finite angle, except normal incidence, to a plane lying perpendicularly to the axis of rotation of the light deflector.

For example, diverging rays of light emitted from a semiconductor laser are rendered parallel by a collimator lens, and then converged by a scanning lens positioned in front of a light deflector comprising a rotating polygonal mirror. The converging light beam from the scanning lens falls on reflecting surfaces of the light deflector which extend parallel to the axis of rotation thereof, such that the principal ray of the light beam is applied at an angle $\theta$ to a plane lying perpendicularly to the axis of rotation of the light deflector.

Upon rotation of the light deflector, the light beam reflected therefrom is progressively deflected to scan a scanned object such as a photosensitive drum along its generatrices while forming an image thereon.

The scanning light applied to the photosensitive drum travels in a direction at the angle $\theta$ to the plane normal to the axis of rotation of the light deflector. Therefore, the light beam applied to the light deflector and the light beam reflected therefrom are angularly spaced $2\theta$ out of physical interference with each other.

With the conventional optical beam scanner, as shown in FIG. 18 the collimator lens 1 and the light from the semiconductor laser are disposed on a straight line aligned with the path of travel of the principal ray immediately before it is applied to the reflecting surfaces of the light deflector. This arrangement requires that the semiconductor laser and the photosensitive drum be spaced a certain distance from each other along the axis of rotation of the light deflector, resulting in an obstacle to efforts to reduce the size of the optical scanning system.

One solution is to fold the optical path with a prism and a mirror, thereby reducing the distance between the semiconductor laser and the photosensitive drum. However, the inclusion of these prism and mirror makes the scanner structurally complex and increases the cost of the scanner.

SUMMARY OF THE INVENTION

It is an object of the present invention to provide an optical beam scanning system which is of a small size relatively simple structurally, and low in cost.

To achieve the above object, an optical beam scanning system of the invention has a scanning lens which is disposed in front of a light deflector such that the optical axis of the scanning lens extends perpendicularly to the axis of rotation of the light deflector, and that a light beam will be applied to the scanning lens parallel to the optical axis thereof and at a height of incidence, i.e., a lens light, on the scanning lens. Since the optical path along which the light beam travels is bent by the refracting action of the scanning lens of the optical beam scanning system, no special optical path folding means such as a prism or a mirror is required, and hence the optical beam scanning system can be simple in construction and small in size.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is a plan view of an optical beam scanning system according to a seventh embodiment of the present invention;

FIG. 13 is a front elevational view of the optical beam scanning system illustrated in FIG. 12;

FIG. 14 is a front elevational view of an optical beam scanning system according to a eighth embodiment of the present invention;

FIG. 15 is a plan view of a light deflector in the optical beam scanning system of FIG. 14;

FIG. 16 is a perspective view of the optical beam scanning system of FIG. 14;

FIG. 17 is a front elevational view of a partly removed scanning lens;

FIG. 18 is a front elevational view of a conventional scanning lens which is not partly removed.

DESCRIPTION DESCRIPTION

Figure 1:
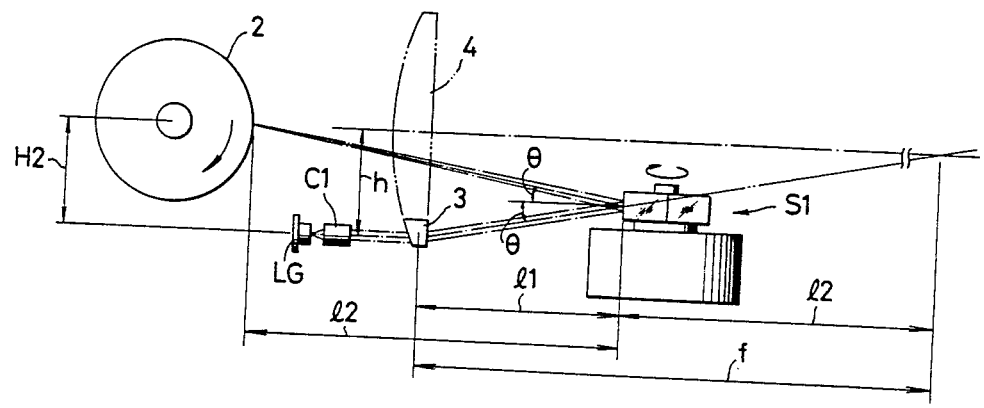
FIG. 1 is a front elevational view of an optical beam scanning system according to a first embodiment of the present invention.

First embodiment (FIGS. 1 and 2):

A scanning lens 3 is disposed between a light deflector S1 comprising a rotating polygonal mirror and a light source LG comprising a semiconductor laser. The scanning lens 3 comprises a portion of a spherical lens 4 which is indicated by the two-dot-and-dash line in FIGS. 1 and 2.

The scanning lens 3 is arragned such that its optical axis extends perpendicularly to the axis of rotation of the light deflector S1 and that a light beam will be applied to the scanning lens 3 at a lens height h and parallel to the optical axis of the scanning lens 3.

A light beam which has been applied to the scanning lens 3 is refracted thereby so as to be directed toward the focal point of the scanning lens 3. The light beam refracted by the scanning lens 3 is then reflected by a reflecting surface of the light deflector S1 to form an image on a photosensitive body 2 in the form of a drum.

Assuming that the angle of incidence to the light deflector is $\theta$, and the scanning lens 3 has a focal length f and a lens height h, the relationship $\sin \theta = h/f$ can be established.

The sum of the distance l1 from the principal plane in the image space of the scanning lens 3 to the reflecting surface of the light deflector S1 and the distance l2 from the reflecting surface of the light deflector S1 to the surface of the photosensitive body 2 being scanned, is substantially equal to the focal length f of the scanning lens 3 since the surface of the photosensitive body 2 is required to be scanned with a beam spot of a small spot diameter.

With the optical system thus arranged, the optical path for the light beam to be applied to the light deflector S1 therealong is bent by the scanning lens 3, and hence the semiconductor laser LG is positioned at the same level as that of the scanning lens 3.

As a consequence, the distance H2 from the point where the light beam is emitted from the semiconductor laser LG to the scanned surface of the photosensitive body 2 in the direction of the axis of the light deflector S1 is smaller than that of the conventional optical beam scanning system. This is advantageous in that the optical components can be arranged with reference to mutually perpendicular horizontal and vertical planes, and an optical housing accommodating the optical components can easily be constructed.

Inasmuch as the light beam falling on the scanning lens 3 is not variable in position, it may be a portion of the spherical lens 4 in order to avoid physical interference with the scanning light traveling from the light deflector S1 to the photosenstive body 2. Consequently, a pluratliy of scanning lenses can be produced from a single spherical lens.

Second embodiment (FIGS. 3 and 4):

The reflecting surfaces of a light deflector are apt to be inclined out of mutual parallelism due to oscillation of the axis of rotation of the light deflector and small assembling errors since the light deflector is mechanically constructed and rotated in use.

Such a parallelism error or inclination is compensated for by a correction lens disposed in an optical beam scanning system. To provide different lens powers in the scanning direction downstream of the light deflector and a direction (hereinafter referred to as an auxiliary scanning direction) normal to the scanning direction for compensation for the parallelism error, there is provided a cylindrical lens in the optical path upstream of the light deflector, the cylindrical lens having a power in the auxiliary scanning direction. The cylindrical lens serves to control the light beam which scans the photosensitive body 2 to have required shape and size.

Figure 3:
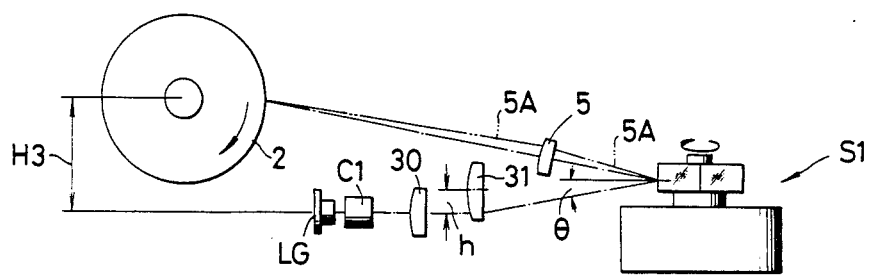
FIG. 3 is a front elevational view of an optical beam scanning system according to a second embodiment of the present invention.
Figure 4:
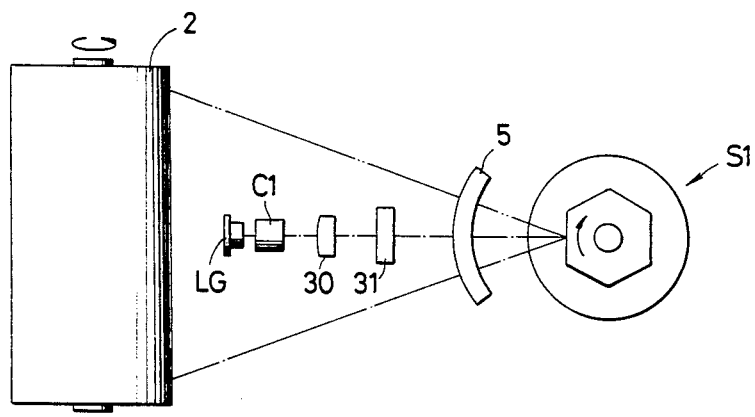
FIG. 4 is a plan view of the optical beam scanning system shown in FIG. 3.

As illustrated in FIGS. 3 and 4, a lens 5 for compensating for a parallelism error comprises a toroidal lens. A scanning light beam reflected from an inclined reflecting surface passes along an optical path 5A. A cylindrical lens 31 is capable of compensating the lens power provided by the toroidal lens 5. The cylindrical lens 31 has its optical axis extending perpendicularly to the axis of rotation of the light deflector S1. A light beam emitted from a semiconductor laser LG is applied to the cylindrical lens 31 at a lens height h and parallel to the optical axis of the cylindrical lens. A scanning lens 30 comprising a spherical lens serves to converge the light beam onto a photosensitive body 2.

The relationship $\sin \theta = h/f1$ where f1 is the focal length of the cylindrical lens 31 is effective for the cylindrical lens 31

With the optical beam scanning system shown in FIGS. 3 and 4, the distance H3 from the semiconductor laser LG to the photosensitive body 2 is small.

Figure 2:
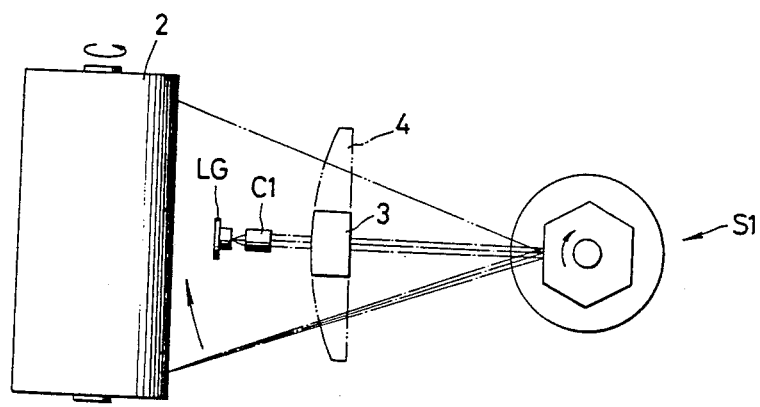
FIG. 2 is a plan view of the optical beam scanning system shown in FIG. 1.
Figure 5:
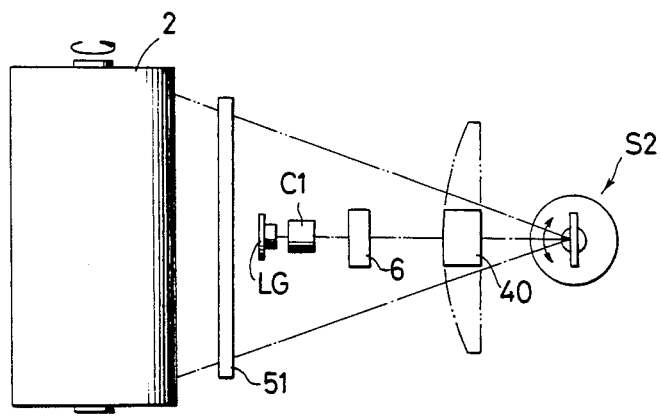
FIG. 5 is a plan view of an optical beam scanning system according to a third embodiment of the present invention.
Figure 6:
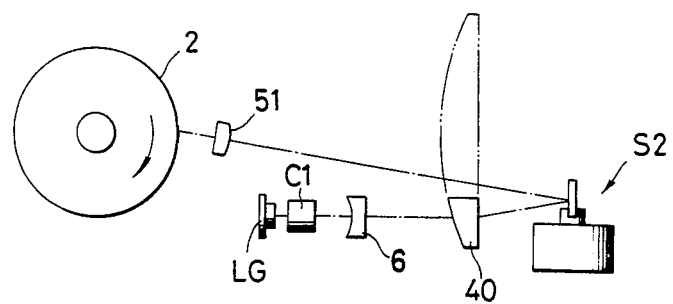
FIG. 6 is a front elevational view of the optical beam scanning system shown in FIG. 5.

Third embodiment (FIGS. 5 and 6):

The optical beam scanning system according to the third embodiment is a modification of the second embodiment. A lens 51 for correcting a parallelism error of a light deflector S2 comprises a plano-convex cylindrical lens disposed immediately in front of a photosensitive body 2. The lens power of the plano-convex cylindrical lens 51 is corrected by a plano-concave cylindrical lens 6 disposed immediately behind a collimator lens C1. A scanning lens 40 is identical to that of the first embodiment (FIGS. 1 and 2).

The light deflector S2 comprises a galvanometer mirror angularly movable about an axis, with respect to which the scanning lens 40 is arranged. Therefore, the axis of angular movement of the light deflector S2 is equivalent to the axis of rotation of the rotatable light deflector.

The distance between the semiconductor laser LG and the photosensitive body 2 is reduced by the refracting action of the scanning lens 40.

Figure 7:
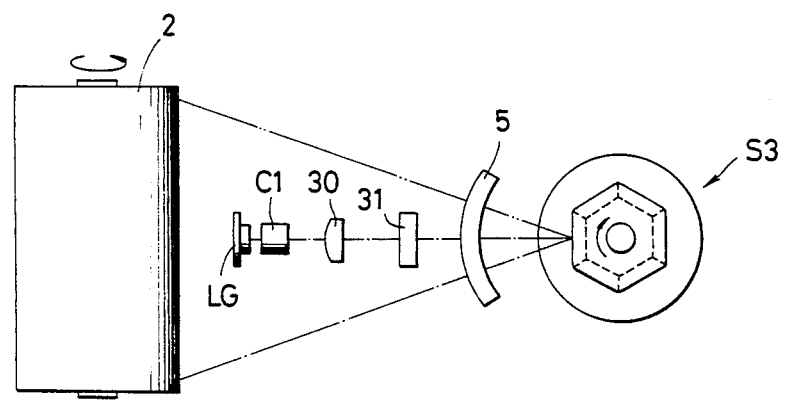
FIG. 7 is a plan view of an optical beam scanning system according to a fourth embodiment of the present invention.
Figure 8:
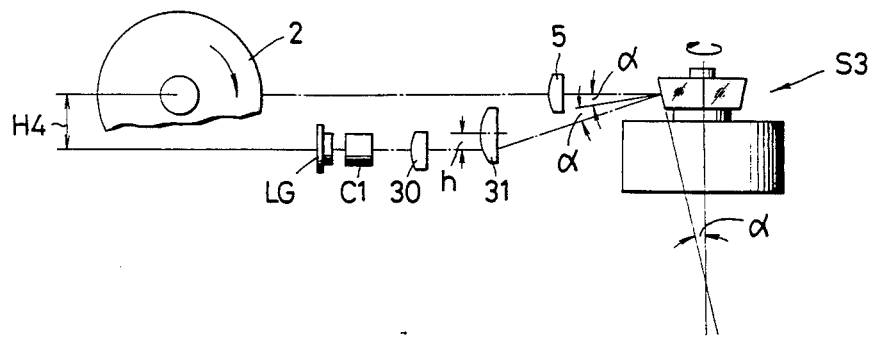
FIG. 8 is a front elevational view of the optical beam scanning system shown in FIG. 7.

Fourth embodiment (FIGS. 7 and 8):

The optical beam scanning system shown in FIGS. 7 and 8 is substantially the same as that of the second embodiment (FIGS. 3 and 4) except that a light delector S3 comprises a pyramidal mirror.

In the first to third embodiments, the reflecting surfaces of the light deflectors S1, S2 extend parallel to the axis of rotation thereof, and hence the light beam reflected from these light deflectors is inclined at the same angle $\theta$ to a plane normal to the axis of rotation as the angle $\theta$ at which the light beam is applied to the light deflectors.

According to the fourth embodiment, however, reflecting surfaces of the light deflector S3 are inclined at angle $\alpha$ to the axis of rotation thereof. Therefore, where the angle of incidence to the light deflector S3 is $\alpha$, the angle of reflection is also $\alpha$, and the relationship $\sin(-2\alpha) = h/f2$ where f2 is the focal length of a cylindrical lens is established, with the result that the scanning light beam applied to a photosensitive body 2 will be substantially horizontal. The distance H4 between a semiconductor laser LG and the photosensitive body 2 is smaller than those of the first through third embodiments.

Figure 9:
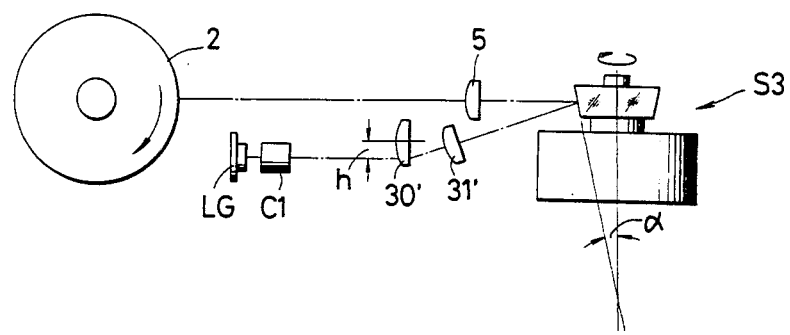
FIG. 9 is a front elevational view of an optical beam scanning system according to a fifth embodiment of the present invention.

Fifth embodiment (FIG. 9):

The fifth embodiment is a modification of the fourth embodiment (FIGS. 7 through 8). A scanning lens 30' comprising a spherical lens has an optical axis normal to the axis of rotation of a light deflector S3. A light beam is applied to the scanning lens 30' at a lens height h and parallel to the optical axis of the scanning lens 30'. A cylindrical lens 31' is disposed such that its optical axis is aligned with the optical path along which a light beam refracted by the scanning lens 30' travels. The optical beam scanning system of the fifth embodiment is as advantageous as the fourth embodiment.

Figure 10:
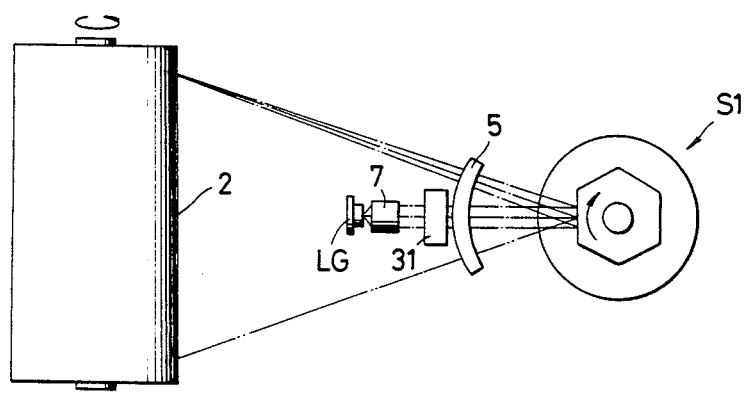
FIG. 10 is a plan view of an optical beam scanning system according to a sixth embodiment of the present invention.
Figure 11:
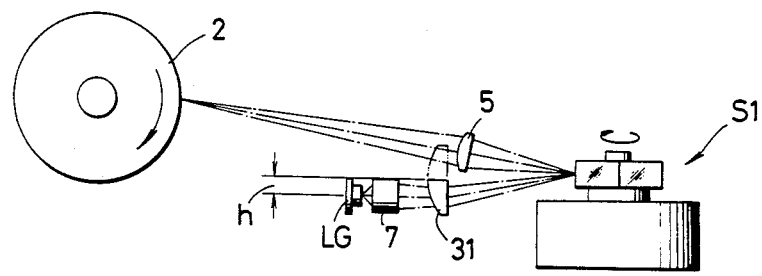
FIG. 11 is a front elevational view of the optical beam scanning system illustrated in FIG. 10.

Sixth embodiment (FIGS. 10 and 11):

The sixth embodiment is a modification of the second embodiment (FIGS. 3 and 4), and differs therefrom in that the collimator lens C1 of the second embodiment is replaced with a coupling lens 7 capable of directly focusing a diverging light beam from a semiconductor laser LG onto a photosensitive body 2, and that there is not employed a lens corresponding to the scanning lens 30 of the second embodiment. The fifth embodiment is as advantageous as the second embodiment.

In the auxuliary scanning direction, an optical system has a beam waist in the auxiliary scanning direction which is in the vicinity of the reflecting surfaces of a light deflector S1 and a lens 5 for correcting a parallelism error or inclination of the light deflector S1, the lens 5 serving to form an image on a photosensitive body 2. This arrangement allows a cylindrical lens 31 of a short focal point to be empoyed for permitting a large angle of incidence with respect to the lens height h.

Seventh embodiment (FIGS. 12 and 13):

According to the seventh embodiment, an optical beam scanning system employs a hologram scanner comprising a hologram as a light deflector S4. A light beam emitted from a light source 8 comprising an He-Ne laser is applied to an ultrasonic light modulator 9, which modulates the light beam with image information. The modulated light beam is then applied to a cylindrical lens 10 with its optical axis normal to the axis of rotation of the light deflector S4. Since the light beam is applied to the cylindrical lens 10 parallel to the optical axis thereof and at a lens height h, the light beam is refracted and applied to the light deflector S4. The light beam is then diffracted and deflected by the light deflector S4 into a converging light beam, which is reflected by a mirror 11 and corrected for deflection surface parallelism by a cylindrical lens 120, from which the light beam falls on a photosensitive body 2.

With this embodiment, the distance between the light beam source 8 and the photosensitive body 2 is reduced by the refracting action of the cylindrical lens 10.

Eighth embodiment (FIGS. 14 through 16):

According to the eighth embodiment, a light deflector S5 comprises a rotating polygonal mirror having reflecting surfaces that are arcuate in a plane in which the mirror rotates.

A semiconductor laser device comprises a semiconductor laser LG as a light source, a collimator lens C1 for rendering diverging light rays parallel, and an aperture member 12 disposed in the path of travel of the parallel rays of light from the collimator lens C1 for shaping the scanning beam cross section into an elliptical form which is longer in the scanning direction and shorter in the auxiliary scanning direction. The parallel light beam emitted from the semiconductor laser device travels toward a first cylindrical lens 13, which shapes the scanning light beam in the auxiliary scanning direction on a photosensitive body 2.

The light beam from the first cylindrical lens 13 is reflected by a first mirror 14 toward the axis of rotation of the light deflector S5. The light beam that has been reflected by the first mirror 14 is applied to a scanning lens 15 parallel to the optical axis thereof and at a height h from the optical axis thereof within a plane including the axis of rotation of the light deflector S5. The scanning lens 15 converges the applied light beam to focus the same on the photosensitive body 2. The light beam bent by the scanning lens 15 is directed toward the light deflector S5 and falls on a reflecting surface parallel to the axis of rotation thereof at an incident angle $\theta(\theta \neq 0°)$ while being oriented to the axis of rotation of the light deflector S5. The light beam is then successively reflected by a plurality of reflecting surfaces of the light deflector S5 which are arcuate within a plane normal to the axis of rotation thereof. The scanning light beam thus produced by the light deflector S5 is reflected by a mirror 16 (shown in FIG. 16, but not in FIG. 14) and goes through a cylindrical lens 17 which corrects a parallelism error of the light deflector S5, for scanning the photosensitive body 2.

FIG. 16 also shows a synchronism detecting means comprising a mirror 18, a cylindrical lens 19, and a sensor 20.

In the optical beam scanning system with the light deflector S5 comprising a cylindrical polygonal mirror, the focal surface formed on the image side by the composite focal length of the arcuate reflecting surfaces of the cylindrical polygonal mirror and the scanning lens 15 is defined on the photosensitive body 2 for converging the light beam thereon. Therefore, the focal point of the scanning lens 15 is positioned between the cylindrical polygonal mirror and the photosensitive body 2, an arrangement different from the first embodiment (FIGS. 1 and 2).

In order to avoid physical interference between the scanning light beam deflected by the light deflector S5 and the scanning lens 15, the scanning lens 15 should be formed as a portion of a spherical lens (see FIG. 14). Where the scanning lens 15 is of a shape smaller than half of a circle as shown in FIG. 17, a plurality of lenses can be produced by cutting off a circular spherical lens, with a resultant cost reduction.

With the optical system employing the cylindrical lens 17 for correcting a parallelism error of the light deflector, a light beam of a cross-sectional shape which is longer in the scanning direction and shorter in the auxiliary scanning direction is applied to the scanning lens 15. Therefore, the scanning lens 15 can be positioned more closely to the light deflector S5 than the conventional arrangement in which a light beam is applied to a scanning lens on its optical axis, and the optical beam scanning system can be designed with greater freedom.

Although certain preferred embodiments have been shown and described, it should be understood that many changes and modifications may be made therein without departing from the scope of the appended claims.

We claim:

1. An optical beam scanning system comprising:
   a laser beam source;
   optical means for shaping a laser beam emitted from said laser beam source
   a light deflector rotatable about an axis thereof;
   a surface to be scanned; and
   an image-forming lens disposed in front of said light deflector with respect to a path of travel of said laser beam for applying the laser beam shaped by said optical means to said light deflector while orienting the laser beam toward said axis thereof at finite angle to a plane normal to said axis of the light deflector, for thereby allowing said light deflector to reflect the applied laser beam successively to scan said surface therewith, said image-forming lens having an optical axis extending perpendicularly to said axis of the light deflector and being arranged such that the laser beam is applied to the image-forming lens parallel to and at a lens height from the optical axis of said image-forming lens.

2. An optical beam scanning system according to claim 1, wherein said laser beam source comprises a semiconductor laser.

3. An optical beam scanning system according to claim 2, wherein said optical means comprises a collimator lens for rendering parallel diverging rays of the laser beam emitted from said semiconductor laser.

4. An optical beam scanning system according to claim 1, wherein said light deflector comprises a rotating polygonal mirror having a plurality of reflecting surfaces lying parallel to said axis of the light deflector.

5. An optical beam scanning system according to claim 1, wherein said image-forming lens comprises a scanning lens shaped as a portion of a spherical lens.

6. An optical beam scanning system according to claim 5, wherein said scanning lens has an optical axis extending perpendicularly to said axis of the light deflector and is arranged such that the laser beam is applied to the scanning lens parallel to and at a lens height from the optical axis of said scanning lens.

7. An optical beam scanning system according to claim 6, wherein said scanning lens and said light deflector are related to each other to meet the relationship $\sin \theta = h/f$, where $\theta$ is the angle of incidence of the light beam from said scanning lens to said light deflector, f is the focal length of said scanning lens, and h is said lens height.

8. An optical beam scanning system according to claim 7, wherein the sum of a distance $l_1$ from a principal plane of the image side of said scanning lens to a feflecting surface of said light deflector and a distance $l_2$ from said reflecting surface to the surface to be scanned, is substantially equal to the focal length f of said scanning lens.

9. An optical beam scanning system comprising:
a laser beam source;
optical means for shaping a laser beam emitted from said laser beam source;
a light deflector angularly movable about an axis thereof;
a surface to be scanned;
an image-forming lens disposed in front of said light deflector with respect to a path of travel of said laser beam for applying the laser beam shaped by said optical means to said light deflector while orienting the laser beam toward said axis thereof, at a finite angle to a plane normal to said axis of the light deflecetor, for thereby allowing said light deflector to reflect the applied laser beam successively to scan said surface therewith;
a alens disposed behind said light deflector with respect to said path for correcting a prallelism error of said light deflector; and
a power compensation lens disposed in front of said light deflector with respect to said path for correcting the power of said correcting lens, said power compensation lens having an optical axis extending perpendicularly to said axis of the light deflector and being arranged such that the laser beam is applied to the image-forming lens parallel to and at a lens height from the optical axis of said image-forming lens.

10. An optical beam scanning system according to claim 9, wherein said laser beam source comprises a semiconductor laser.

11. An optical beam scanning system according to claim 10, wherein said optical means comprises a collimator lens rendering parallel diverging rays of the laser beam emitted from said semiconductor laser.

12. An optical beam scanning system according to claim 9, wherein said light deflector comprises a rotating polygonal mirror having a plurality of reflecting surfaces lying parallel to said axis of the light deflector.

13. An optical beam scanning system according to claim 9, wherein said image-forming lens comprises a spherical lens having an optical axis extending perpendicularly to said axis of the light deflector.

14. An optical beam scanning system according to claim 9, wherein said power compensation lens comprises a cylindrical lens having a power in an auxiliary scanning directon normal to a scanning direction in which said surface is scanned.

15. An optical beam scanning system according to claim 14, wherein said correcting lens comprises a toroidal lens.

16. An optical beam scanning system according to claim 14, wherein said cylindrical lens has an optical axis extending perpendicularly to said axis of the light deflector and is arranged such that the laser beam is applied to the cylindrical lens parallel to the optical axis thereof and at a lens height from the optical axis.

17. An optical beam scanning system according to claim 16, wherein said cylindrical lens and said light deflector are related to each other to meet the relationship $\sin \theta = h/f$, where $\theta$ is the angle of incidence of the light beam from said cylindrical lens to said light deflector, f is the focal length of said cylindrical lens, and h is the lens height from the optical axis.

18. An optical beam scanning system comprising:
a laser beam source;
optical means for shaping a laser beam emitted from said laser beam source;
a light deflector angularly movable about an axis thereof;
a surface to be scanned;
an image-forming lens disposed in front of said light deflector with respect to a path of travel of said laser beams for applying the laser beam shaped by said optical means to said light deflector while orienting the laser beam toward said axis thereof, at a finite angle to a plane normal to said axis of the light deflector, for thereby allowing said light deflector to reflect the applied laser beam successively to scan said surface therewith;
a correcting lens disposed behind said light deflector with respect to said path for correcting a parallelism error of said light deflector; and
a power compensation lens disposed in front of said light deflector with respect to said path for correcting the power of said correcting lens, said image-forming lens being disposed behind said power compensation lens and in front of said light deflector with respect to said path and having an optical axis extending perpendicularly to said axis of the light deflector and being arranged such that the laser beam is applied to the image-forming lens parallel to and at a lens height from the optical axis of said image-forming lens.

19. An optical beam scanning system according to claim 18, wherein said light deflector comprises a rotating cylindrical polygonal mirror having a plurality of reflecting surfaces which are arcuate within a plane in which the rotating polygonal mirror rotates.

20. An optical beam scanning system according to claim 18, wherein said light deflector comprises a galvanometer mirror.

21. An optical beam scanning system according to claim 18, wherein said image-forming lens is shaped as a portion of a spherical lens.

22. An optical beam scanning system according to claim 18, wherein said power compensation lens comprises a plano-concave cylindrical lens having a power in an auxiliary scanning direction normal to a scanning direction in which said surface is scanned.

23. An optical beam scanning system according to claim 18, wherein said correcting lens comprises a planoconvex cylindrical lens.

24. An optical beam scanning system according to claim 21, wherein said image-forming lens has an optical axis extending perpendicularly to said axis of the light deflector and is arranged such that the laser beam is applied to the image-forming lens parallel to the optical axis thereof and at a lens height from the optical axis.

25. An optical beam scanning system according to claim 24, wherein said image-forming lens and said light deflector are related to each other to meet the relationship $\sin \theta = h/f$, where $\theta$ is the angle of incidence of the light beam from said image-forming lens to said light deflector, $f$ is the focal length of said image-forming lens, and $h$ is the lens height from the optical axis.

26. An optical beam scanning system according to claim 18, wherein said light deflector comprises a rotating pyramidal polygonal mirror having a plurality of reflecting surfaces which extend at an angle to said axis of the light deflector.

27. An optical beam scanning system according to claim 26, wherein said image-forming lens comprises a spherical lens having an optical axis normal to said axis of the light deflector.

28. An optical beam scanning system according to claim 26, wherein said power compensation lens comprises a cylindrical lens having a power in an auxiliary scanning direction normal to a scanning direction in which said surface is scanned.

29. An optical beam scanning system according to claim 28, wherein said correcting lens comprises a toroidal lens.

30. An optical beam scanning system according to claim 28, wherein said cylindrical lens has an optical axis extending perpendicularly to said axis of the light deflector and is arranged such that the laser beam is applied to the cylindrical lens parallel to the optical axis thereof and at a lens height from the optical axis.

31. An optical beam scanning system according to claim 30, wherein said cylindrical lens and said light deflector are related to each other to meet the relationship $\sin 2\alpha = h/f2$, where $\alpha$ is the angle of incidence of the light beam from the optical axis of said cylindrical lens to the plane normal to the axis of rotation of said light deflector, $f2$ is the focal length of said cylindrical lens, and $h$ is the lens height from the optical axis.

32. An optical beam scanning system comprising:
a laser beam source;
optical means for shaping a laser beam emitted from said laser beam source;
a light deflector angularly movable about an axis thereof;
a surface to be scanned;
an image-forming lens disposed in front of said light deflector with respect to a path of travel of said laser beam for applying the laser beam shaped by said optical means to said light deflector while orienting the laser beam toward said axis thereof, at a finite anlge to a plane normal to said axis of the light deflector, for thereby allowing said light deflector to reflect the applied laser beam successively to scan said surface therewith;
a correcting lens disposed behind said light deflector with respect to said path for correcting a parallelism error of said light deflector; and
a power compensation lens disposed in front of said light deflector with respect to said path for correcting the power of said correcting lens, said image-forming lens being disposed in front of said power compensation lens with respect to said path and having an optical axis extending perpendicularly to said axis of the light deflector and being arranged such that the laser beam is applied to the image-forming lens parallel to the optical axis thereof and at a lens height from the optical axis.

33. An optical beam scanning system according to claim 32, wherein said laser beam source comprises a semiconductor laser.

34. An optical beam scanning system according to claim 33, wherein said optical means comprises a collimator lens for rendering parallel diverging rays of the laser beam emitted from said semiconductor laser.

35. An optical beam scanning system according to claim 32, wherein said light deflector comprises a rotating pyramidal polygonal mirror having a plurality of reflecting surfaces extending at an angle to said axis of the light deflector.

36. An optical beam scanning system according to claim 32, wherein said image-forming lens comprises a spherical lens having an optical axis extending perpendicularly to said axis of the light deflector and arranged such that the laser beam is applied to the spherical lens parallel to the optical axis thereof and at a lens height from the optical axis.

37. An optical beam scanning system according to claim 36, wherein said power compensation lens comprises a cylindrical lens having an optical axis aligned with a path of travel of the laser beam as refracted by said spherical lens.

38. An optical beam scanning system according to claim 32, wherein said power compensation lens comprises a cylindrical lens having a power in an auxiliary scanning direction normal to a scanning direction in which said surface is scanned.

39. An optical beam scanning system according to claim 32, wherein said correcting lens comprises a toroidal lens.

40. An optical beam scanning system comprising:
a laser beam source;
optical means for shaping a laser beam emitted from said laser beam source;
a light deflector angularly movable about an axis thereof;
a surface to be scanned;
means for applying the laser beam shaped by said optical means to said light deflector while orienting the laser beam toward said axis thereof, at a finite angle to a plane normal to said axis of the light deflector, for thereby allowing said light deflector to reflect the applied laser beam successively to scan said surface therewith;
a first lens disposed in front of said light deflector with respect to said path for correcting a parallelism error of said light deflector; and a second lens disposed behind said light deflector with respect to said path for correcting a parallelism error of said light deflector, said first lens having an optical axis extending perpendicularly to said axis of the light deflector and arranged such that the laser beam is applied to the first lens parallel to and at a lens height from the optical axis of the first lens.

41. An optical beam scanning system according to claim 40, wherein said laser beam source comprises a semiconductor laser.

42. An optical beam scanning system according to claim 41, wherein said optical means comprises a coupling lens for directly focusing diverging rays of the laser beam emitted from said semiconductor laser onto said surface.

43. An optical beam scanning system according to claim 42, wherein said light deflector comprises a rotating polygonal mirror having a plurality of reflecting surfaces lying parallel to said axis of the light deflector.

44. An optical beam scanning system according to claim 40, wherein said first lens comprises a cylindrical lens having a power in an auxiliary scanning direction normal to a scanning direction in which said surface is scanned.

45. An optical beam scanning system according to claim 44, wherein said second lens comprises a toroidal lens.

46. An optical beam scanning system according to claim 44, wherein said cylindrical lens has an optical axis extending perpendicularly to said axis of the light deflector and arranged such that the laser beam is applied to the cylindrical lens parallel to the optical axis thereof and at a lens height from the optical axis.

47. An optical beam scanning system comprising:
a laser beam source;
a light deflector angularly movable about an axis thereof;
a surface to be scanned;
means for applying the laser beam from said laser beam source to said light deflector while orienting the laser beam toward said axis thereof, at a finite angle to a plane normal to said axis of the light deflector, for thereby alowing said light deflector to reflect the applied laser beam successively to scan said surface therewith;
a first lens disposed in front of said light deflector with respect to said path for correcting a parallelism error of said light deflector; and
a second lens disposed behind said light deflector with respect to said path for correcting a parallelism error of said light deflector, said first lens having an optical axis extending perpendicularly to said axis of the light deflector and arranged such that the laser beam is applied to the first lens parallel to and at a lens height from the optical axis of said first lens.

48. An optical beam scanning system according to claim 47, wherein said laser beam source comprises an HeNe laser.

49. An optical beam scanning system according to claim 47, wherein said light deflector comprises a hologram scanner.

50. An optical beam scanning system according to claim 47, wherein said first lens comprises a cylindrical lens having a power in an auxiliary scanning direction normal to a scanning direction in which said surface is scanned.

51. An optical beam scanning system according to claim 47, wherein said second lens comprises a cylindrical lens.

52. An optical beam scanning system according to claim 50, wherein said cylindrical lens has an optical axis extending perpendicularly to said axis of the light deflector and arranged such that the laser beam is applied to the cylindrical lens parallel to the optical axis thereof and at a lens height from the optical axis.

* * * * *